April 18, 1961 W. J. JAKIMIUK ET AL 2,980,368
DEVICES FOR THE TAKE-OFF AND LANDING OF AIRCRAFT
Filed Dec. 27, 1956 4 Sheets-Sheet 1
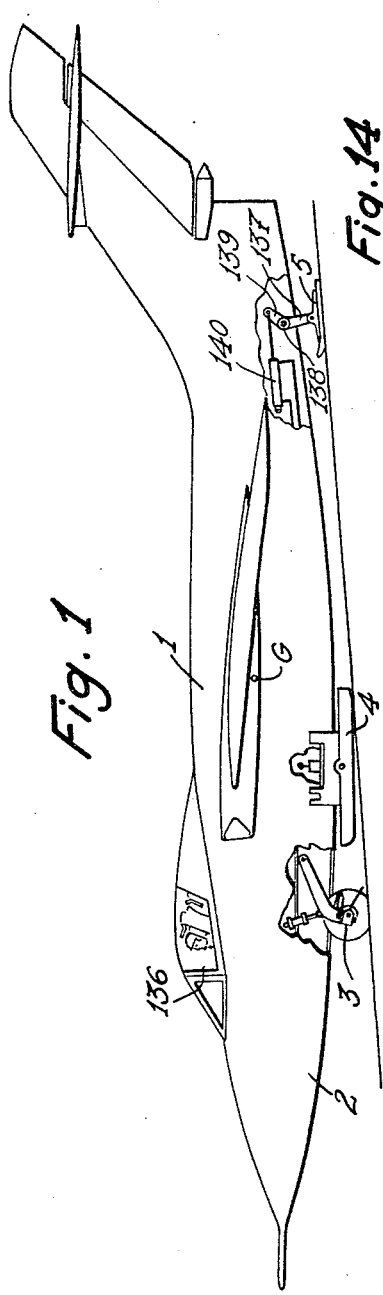
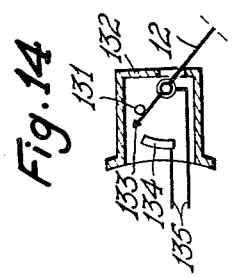
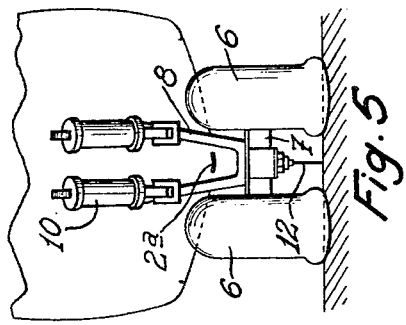
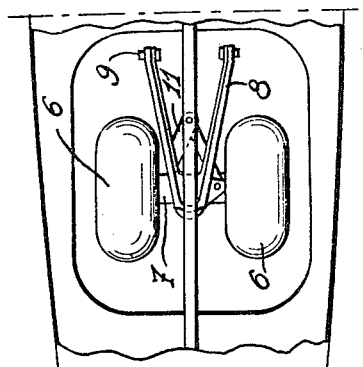
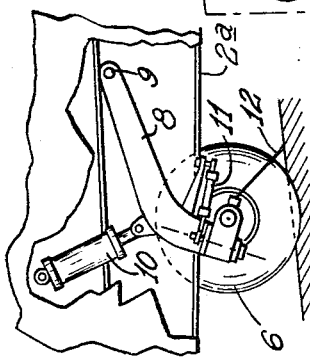
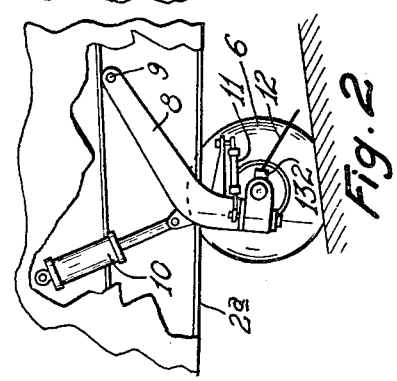

April 18, 1961  W. J. JAKIMIUK ET AL  2,980,368
DEVICES FOR THE TAKE-OFF AND LANDING OF AIRCRAFT
Filed Dec. 27, 1956  4 Sheets-Sheet 2

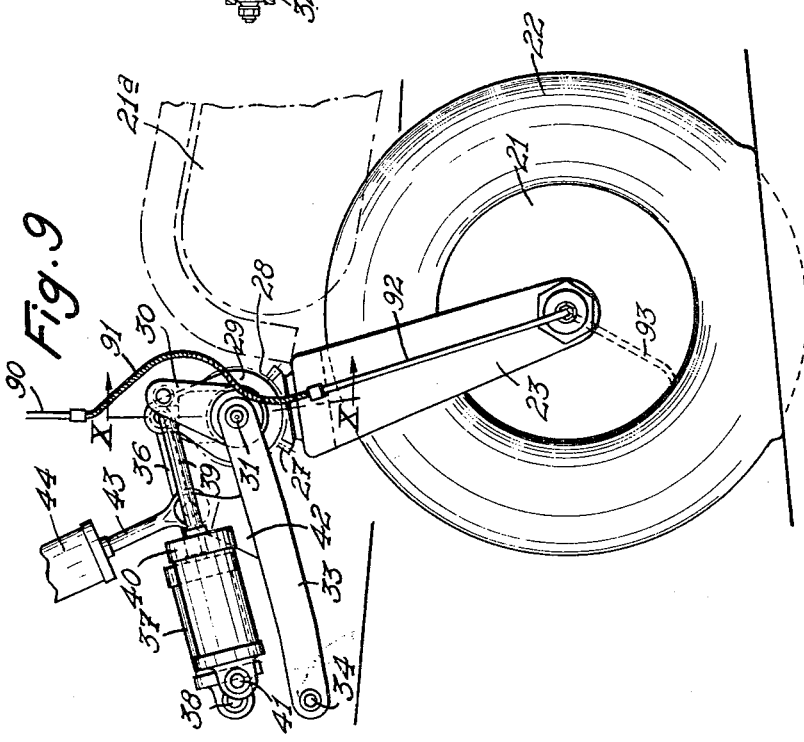

United States Patent Office 2,980,368
Patented Apr. 18, 1961

2,980,368
DEVICES FOR THE TAKE-OFF AND LANDING OF AIRCRAFT

Wsiewolod John Jakimiuk, Paris, and Roger Georges Scoazec, Colombes, France, assignors to Sud-Aviation Société Nationale de Constructions Aéronautiques, Paris, France Filed Dec. 27, 1956, Ser. No. 630,803
Claims priority, application France Dec. 27, 1955
18 Claims. (Cl. 244—102)

In view of solving the important problem of high-speed modern aircraft take-off and landing in the absence of costly and vulnerable concrete runways, different types of aircraft landing-gears or undercarriages incorporating landing-skids or landing-skis have already been proposed.

However, as the take-off runs still remained relatively long owing to the friction developing between these skids or skis and the ground, it was proposed to associate with these skids or skis disposed as a rule somewhat at the rear of the center of gravity of the aircraft a central steering wheel located slightly in front of this center of gravity.

Practical tests showed that landing-gears of the type broadly specified in the last paragraph hereabove were not completely satisfactory under all take-off conditions, especially on soft grounds. In fact, on these grounds the front wheels tend to sink when the take-off is effected without the assistance of auxiliary means, as the aircraft rests simply on its two skids or skis and on its front wheel. If, under these conditions, the action produced by the propelling or power-unit thrust, notably in the case of jet-engine propulsion, is such as to unload the skids and therefore reduce the friction between them and the ground surface, on the other hand the front wheel is overladen and tends to sink if the ground is soft.

Moreover, on hard grounds the front wheel is not properly utilized as the fixed load distribution between this front wheel and the skids, due to the position of the skids at the rear, and in the vicinity, of the center of gravity, results in a substantial loading of these skids and consequently develops a considerable frictional resistance, notably on concrete runways.

Now it is the essential object of this invention to avoid the various inconveniences set forth hereinabove and permit the safe, rapid and short take-off and landing of an aircraft from and on a ground of any firmness, and with this object in view the present invention provides a device for the take-off and landing of aircraft or landing-gear assembly characterised in that it comprises three landing members carried by the fuselage through three transverse planes disposed at right angles to the longitudinal plane of symmetry of the aircraft, two of these planes being located in front of its center of gravity, some of these members being utilized intermittently and more or less operatively according as the aircraft is taking off or landing, and according to the nature and firmness of the ground. Preferably retractable or semi-retractable front wheel or wheels are located in the front transverse plane, retractable central skids in the intermediate transverse plane and a skid or a tail wheel, retractable or not, in the rear transverse plane, the expression "semi-retractable" being used for indicating that the wheels may be raised over the ground without retraction within the fuselage.

In the practice the landing arrangement according to this invention may be embodied to have from six to four bearing points, this number being subordinate to the type of aircraft to be equipped, whether the aircraft is to take off or land, and also to the nature and firmness of the ground, certain manoeuvres taking place with the aircraft bearing on only two points when the arrangement comprises a central front wheel and a single tail-skid.

In view of affording a wider field of use of a wheel adapted for the load which it is to support as a function of the weight of the aircraft and the nature of the ground, it is advantageous to proportion the tyre pressure of this wheel to the nature of the ground; in other words, a higher tyre pressure should be available on a hard and smooth ground surface, and a lower tyre pressure on a soft and/or irregular ground surface.

Besides, in order to simplify the installation and to free the pilot from the constraint of more or less constantly adjusting the vertical position of the wheel or wheels according to the nature of the ground, it is preferable to classify the grounds into a few types so that the pilot's action will be limited to estimating and setting the corresponding case on a suitable control board when he is about to take off or land, it being possible to switch from one case to another, if need be, when taxying about.

However, if after having adapted the tyre pressure to the estimated type of ground surface the wheel occupies a fixed vertical position, dangerous jolts might be caused by unevenness of the ground.

In order to avoid this inconvenience, it is another object of the present invention to provide an improved device for the take-off and landing of aircraft of the character described equipped with front wheel or wheels wherein said front wheel or wheels are carried by a suspension system, preferably of the retractable type, associated with devices adapted, on the one hand, to apply a substantially constant load, preselected by the pilot, to this wheel or these wheels, according to a few typical ground characteristics, and, on the other hand, to automatically alter the vertical position of this wheel according to the actual nature and configuration of the ground.

A third object of the invention is to provide, in a device of the character described equipped with front wheel or wheels, a device adapted to maintain a constant pressure in the tyre of said wheel or wheels, according to a few typical ground characteristics.

A fourth object of the present invention is to provide, in a device of the character described having retractable front landing-gear and central skids, means adapted, on the one hand, to prevent said front landing-gear from being lowered when said central skids are retracted, on the other hand, to automatically retract this front landing gear when these central skids alone are actuated, and, finally, to permit the movement of this front landing-gear when the aircraft rests on at least its central skids.

Other features and advantages of this invention will appear as the following description proceeds with reference to the accompanying drawings forming part of this specification and illustrating diagrammatically by way of example a few possible embodiments thereof. In the drawings:

Fig. 1 shows a first embodiment of a device according to the invention for an aircraft equipped with a semi-retractable landing gear, said aircraft being in the position corresponding to a take-off on a hard ground surface.

Fig. 2 shows on a larger scale the front or foremost section of the landing-gear illustrated in Fig. 1 in the position suitable for taxying the aircraft on a hard ground, the left-hand wheel being removed for the sake of clarity.

Fig. 3 is a view similar to Fig. 2 but showing the front-wheel gear in a position suitable for taxying the aircraft on a soft ground.

Figs. 4 and 5 are plan views from above with the jack removed and a front elevational view respectively of the front dolly equipping the aircraft illustrated in Fig. 1.

Fig. 9 is a side elevational view of a retractable single-wheel landing-gear and of the jacks associated therewith according to a second embodiment.

Fig. 10 is a section taken along the line X—X of Fig. 9.

Fig. 11 is a plan view from beneath showing the landing-gear of Fig. 10 in its retracted position.

Fig. 12 shows on a larger scale and in axial section the rotary sealed joint of the tyre-inflating device illustrated in Fig. 9.

Fig. 14 represents at greater scale the mounting of the ground-engaging feeler illustrated in Figs. 1 to 3 and its connecting device with the circuit which feeds a tell-tale lamp.

Figure 6:
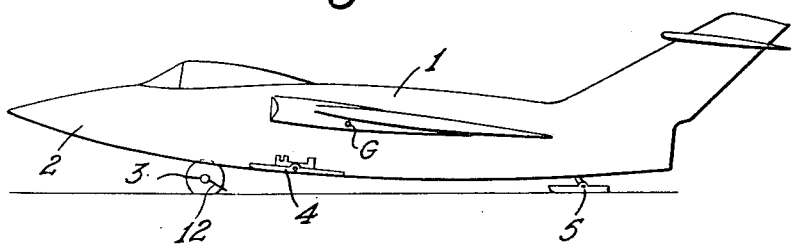
Fig. 6 illustrates on a reduced scale the aircraft of Fig. 1 just about to complete a take-off from a hard ground.

In the embodiment illustrated in Figs. 1 to 8 of the drawings the aircraft 1 is equipped with a landing-gear assembly carried by the aircraft fuselage 2; the essential component elements of this assembly are a semi-retractable front dolly landing-gear 3, a pair of lateral skids 4 disposed in front of the center of gravity G, and a tail skid 5 adjacent to the rear end of the aircraft 1.

The dolly 3 comprises a pair of wheels 6 mounted on a common axle 7 carried in turn by a V-shaped support 8 pivoted at 9 on the aircraft fuselage 2 and normally held in a semi-retracted position by jacks 10 in a cavity provided for this purpose in the fuselage body until support 8 contacts the central part 2a of the fuselage. On the other hand, this axle is adapted to be steered under the pilot's control through a conventional linkage system 11 immaterial with the present invention.

Associated with the semi-retractable front landing-gear unit is a feeler rod 12 adapted to measure either the tyre deformation under the prevailing load and inflation conditions, or the degree of sinking of the wheel in the ground. This feeler 12 bearing against a stop 131 carried by the casing 132 secured on support 8 is provided at its end with a slider 133 adapted to engage a conductive sector 134 inserted in the circuit 135 (Fig. 14) which feeds a tell-tale lamp 136 positioned in front of the pilot and which is adapted to light up when the lower end of the feeler engages the ground so that the pilot thus warned, may actuate the jacks 10 to retract the dolly landing-gear to a limited extent. This feeler may also be associated with a device adapted to control directly and automatically, i.e. without the pilot's intervention, the retracting mechanism. A delayed operation may be provided in this system to make due allowance for the jolts to which the aircraft may be subjected when taking-off or landing.

The central skids 4 are retractable and, as well as their control device, preferably of the type described and illustrated in the U.S. Patent No. 2,741,446.

The tail-skid 5 comprises a single ground-engaging member and its dimensions are greater than those of tail-skids of conventional landing-gears. Said tail-skid 5 is pivotally mounted on an arm 137 pivoted at 138 and fast with a lever 139 connected to a retracting jack 140.

The device so far described operates as follows:

On a hard ground, the aircraft displacements and take-offs are effected with the aircraft supported by its tail-skid 5 and front wheels 6 as illustrated in Figs. 1 and 6. The deformation of the wheel tyres on this hard ground is such that the feeler will not touch the ground surface. Thus, the frictional resistance is reduced to a substantial extent as the tail-skid 5 is moderately loaded and the front wheels 6 properly utilized.

At low speeds the pilot lowers the central skids 4 which, due to the complete lowering of the front wheel, do not contact the ground and act simply as means for limiting the transverse movements of the aircraft.

Figure 7:
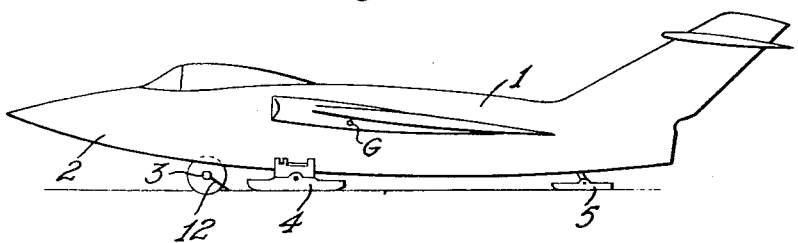
Fig. 7 is a view similar to Fig. 6, the aircraft taking off from a soft ground.

If at these low speeds the ground becomes soft, the front wheels 6 will somewhat sink therein. When this sinking is about to impair the balance of the aircraft the contact feeler 12 touches the ground and as a consequence the wheels 6 are partially raised by the actuation of the jacks 10 controlled either automatically or by the pilot warned by the lighting of the tell-tale lamp, thereby reducing the load on the wheels 6 and loading the central skids 4. Thus, the aircraft bears on the ground through the front wheels 6, the central skids 4 and the tail-skids 5 (Fig. 7). Consequently, the load distribution is adequately balanced among these three landing-gear assembly component elements according to the firmness of the ground on which the aircraft is moving.

As the aircraft speed increases, the pair of central skids 4 are retracted as soon as possible. Therefore, the front wheels 6 receive their maximum permissible load which is subordinate to the tyre deformation on a hard ground or to the wheel sinking on a soft ground, the remaining weight of the aircraft being supported by the tail-skid 5.

Figure 8:
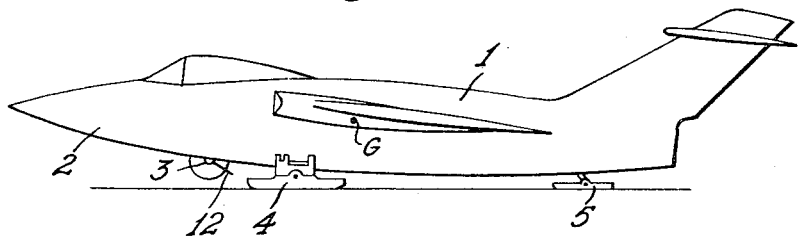
Fig. 8 is a view similar to Fig. 6 but showing the aircraft during the initial touch-down.

When landing and as illustrated in Fig. 8 the pilot does not lower the front dolly 3 and the aircraft makes contact with the ground through the tail-skid 5 and central skids 4, the latter supporting the major portion of the load and reducing considerably the landing run due to the substantial frictional resistance developing between these skids and the ground surface. Upon completion of the landing run the pilot lowers the front wheels of which the position and therefore the action are consistent with the nature of the ground as indicated by the feeler 12 either automatically or under the pilot's control. Subsequently, the aircraft is taxied exactly as in the case of low take-off speeds.

In the embodiment illustrated in Figs. 9 to 13 the single-wheel front landing gear is supported by a double parallel-link system. It comprises a wheel 21 provided with a tyre 22 and mounted on a cranked arm 23 carrying an integral pivot pin 24 journalled in a bushing 25 formed integrally or rigid with a torsion shaft 26 (see Fig. 10). The pivot pin 24 is rigid with a toothed segment 27 in constant meshing engagement with another toothed segment 28 mounted for free rotation on and coaxial with the aforesaid torsion shaft 26. This other toothed segment 28 is rigid with an arm 29 having a yoke-shaped outer end, a similar arm 30 being rigid with the torsion shaft 26, as shown.

The two ends of the torsion shaft 26 are mounted for rotation in bearings 31, 32 fitted in a substantially box-sectioned member 33 secured through lugs 34, 35 to the aircraft frame structure.

The yoke-carrying arm 29 is connected through a rod 36 to a fluid-pressure cylinder or jack 37 secured at 38 to the aircraft frame structure and adapted to control the landing-gear steering movements. Similarly, the yoke-carrying arm 30 is connected through a rod 39 to another fluid-pressure cylinder or jack 40 secured on the aircraft frame structure at 41 and adapted to control the retraction of the landing-gear.

The box-sectioned member 33 is provided with an integral yoke-shaped anchorage lug 42 having pivoted thereon the rod 43 of a suspension and load jack 44.

The box-sectioned member 33 and the retracting and steering jacks 40, 37 fulcrumed at 41 and 38 respectively form a pair of parallel-link systems whereby the wheel may be moved in a vertical plane under the control of the jack 44 without interfering on the one hand with the angle of steering of the wheel or the inclination of the cranked arm 23 when no variation is brought in the lengths of the external portions of the rods 36 and 39, and on the other hand with the effort produced through the suspension and adjustment jack 44, as will be explained presently.

The wheel is retracted and lowered under the control of the jack 40 as the toothed segment 28 is held against movement by the other jack 37. On the other hand the wheel steering is controlled through the jack 37 and in this case the shaft 26 is held against movement by the other jack 40. When the wheel is retracted, the toothed segment 28 being locked, the other toothed segment 27 causes the pivot pin 24 to rotate in its bushing to move the plane of the wheel 21 through 90° to its fully retracted position illustrated in chain-dotted lines in Fig. 9, at 21a.

Figure 13:
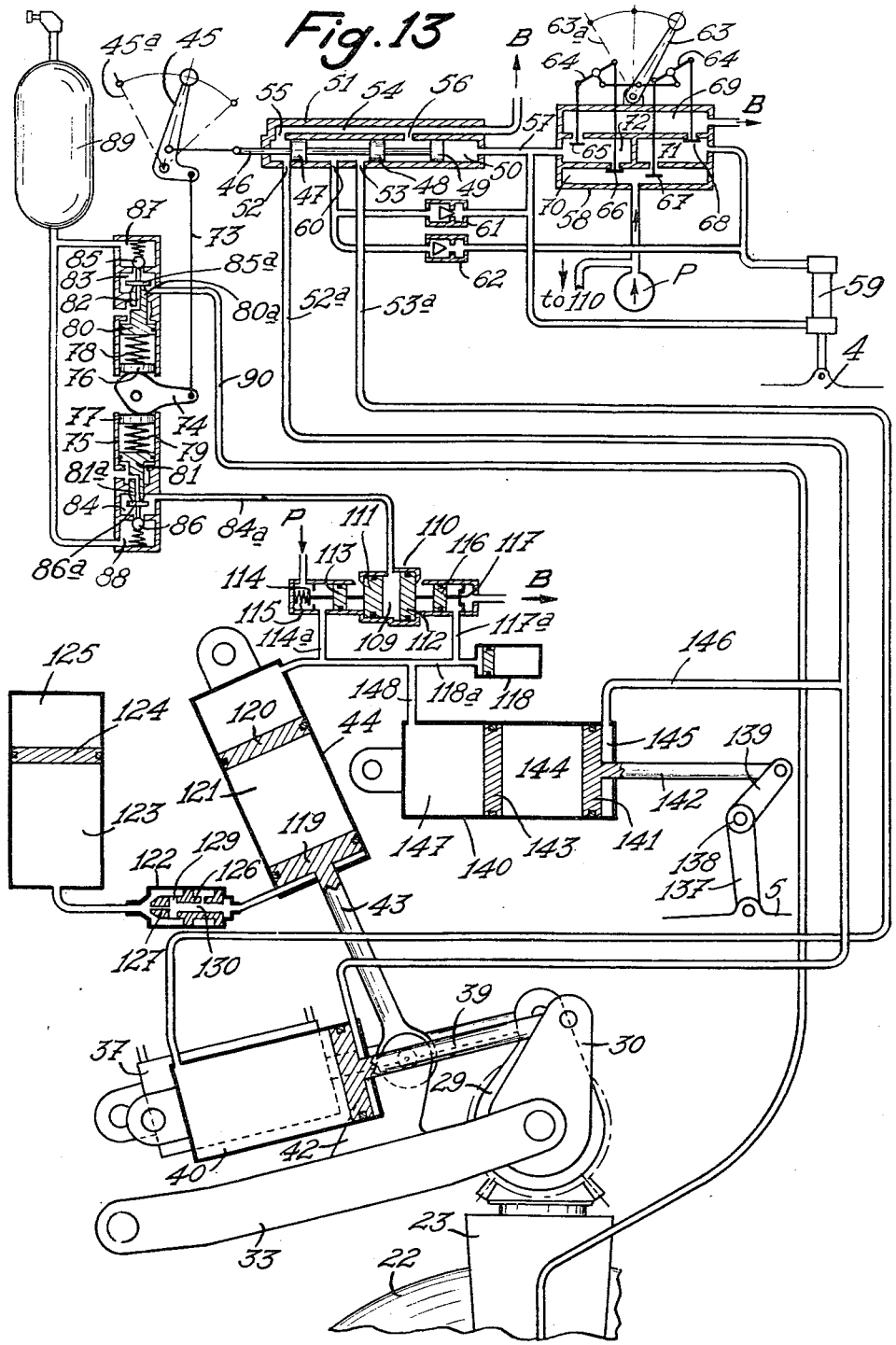
Fig. 13 is a general line diagram illustrating the arrangements, devices and networks for controlling and feeding the fluid-pressure jacks of the retractable single-wheel illustrated in Fig. 9 and the retractable central skids and tail skid of a same aircraft, according to the second embodiment.

The retracting jack 40 and the suspension and adjustment jack 44 are controlled through the control arrangement illustrated in Fig. 13 of the drawings.

This control arrangement comprises inter alia a control lever 45 for presetting typical ground characteristics or cases; this lever 45 is suitably located in the pilot's cockpit and connected to a rod 46 carrying three axially aligned pistons 47, 48, 49 slidably mounted in a chamber 50 formed in a distributor 51 adapted to control the actuation of the wheel-retracting jack 40. This chamber 50 communicates on the one hand through a pair of ports 52, 53 and suitable pipe lines 52a, 53a with the opposite sides of the piston of jack 40, and on the other hand through ports 55, 56 with a chamber 54 connected to a fluid reservoir B (not shown). Besides, the chamber 50 has one end connected through a pipe 57 to the distributor 58 supplying fluid to the jack or jacks 59 controlling the retraction and lowering of the central skids, and similar to the control ram 66 illustrated in the aforesaid U.S. patent, said central skids being controlled by a control assembly similar to that described and illustrated in said patent and not shown again for the sake of clarity. Finally, this chamber 50 communicates through another port 60 with a pair of inverted one-way or non-return valves 61, 62 inserted respectively between this chamber 50 and the lines feeding through the distributor 58 the opposite sides or the piston of jack 59.

This distributor 58 comprises a control lever 63 operatively connected to a double link device 64 adapted to alternately open or seat valves 65, 66 and 67, 68 controlling the passage of fluid between on the one hand a chamber 69 of distributor 58 which is connected to the fluid reservoir B, and a chamber 70 of this distributor which is connected to the main feed pump P, and on the other hand a pair of chambers 71, 72 communicating with the opposite side of the piston of jack 59, respectively.

The presetting lever 45 is connected on the other hand through a rod 73 with the control lever 74 of a double pressure-reducing valve adjustable device 75. The control lever 74 is provided with a pair of cam faces engaged by opposite pistons 76, 77 urged toward these cam faces by suitable spring means such as 78, 79. In this embodiment the springs 78, 79 bear with their outer or opposite ends against two pairs of differential pistons 80, 81 of which the small pistons 80a and 81a are provided with ducts 82. These small pistons are axially movable in chambers 83, 84 adapted to be connected through valves 85, 86 with two chambers 87, 88 both connected to a cylinder 89 containing air under pressure. The valves 85 and 86 are provided with stems 85a and 86a on which the small pistons 80a and 81a bear at rest.

The chamber 83 of the pressure-reducing valve device 75 is connected through a rigid pipe 90 to a flexible pipe 91 connected in turn to another rigid pipe 92 secured on the cranked arm 23 and adapted to feed a tube 93 mounted on the tyre 22 (Fig. 9).

The sealed rotary joint connecting the pipe 92 and tube 93 with each other is illustrated in Fig. 12. The tube 93 is secured in any known manner, for example by hard-soldering, on a substantially cylindrical case 94 secured on the wheel disc 128 so as to rotate bodily therewith; the case 94 is closed at either ends by end caps 95, 96 adapted to press packing elements against a pair of inner washers 97, 98 forming therebetween in the case 94 a central chamber 99 for a purpose to be explained presently. Each packing member consists in this embodiment of a washer 100 of a gas-tight but relatively flexible material, preferably reinforced with fibre material soaked with a suitable lubricant, and another washer or disc 101 of a gas-tight but relatively rigid material, the inner edge of the washer 101 being of labyrinth configuration and engaging a tubular member 103 extending through and coaxial with the case 94; on the end of this tubular member 103, the aforesaid pipe 92 is hard-soldered or otherwise secured. The tubular member 103 is secured inside, and at the free end of, the fixed hub 108 and carries a ring 104 through which radial holes 105 are formed to connect the inner space of the tubular member 103 with the chamber 99. The end of the member 103 which is opposite to the end connected to the pipe 92 carries a screw plug 106. The external surface of the case 94 is provided with a flange 107 for securing by riveting, bolting or otherwise the case 94 on the wheel disc 128 on which the aforesaid tube 93 is attached in any suitable manner. The flexible section 91 of the pipe connection 90, 91, 92 permits the steering and retraction of the wheel 21 without interfering with the inflation pressure of the tyre 22.

The chamber 84 of the double pressure-reducing adjustable device 75 is connected to a chamber 109 of an adjustable overpressure valve 110 through a pipe-line 84a. This variable-capacity chamber is bounded in the valve body by a pair of pistons 111, 112 of which the latter has a greater effective area than the former. The smaller piston 111 is coupled with a piston 113 connected in turn to a valve 114 constantly urged to its seated or closed position by a spring 115 and adapted to control through the pipe-line 114a the communication between the upper chamber of the suspension and load-adjusting jack 44 and the pump P. Similarly the piston 112 is connected to a piston 116 connected in turn to a valve 117 controlling through the pipe-line 117a the communication between the upper chamber of the jack 44 and the return fluid reservoir B. The pipes 114a and 117a are connected to this upper chamber of jack 44 and to an over-pressure accumulator 118 through a common pipe 118a.

The suspension and load-adjusting jack 44 comprises a piston 119 rigid with the rod 43 and another piston 120, an air-filled chamber 121 being located between these pistons. The lower side of the piston 119 communicates through a dashpot valve 122 with a re-feeding accumulator 123 comprising a piston 124 forming an upper, air-filled chamber 125. The movable member 126 of the dashpot valve 122 is provided with a small leakage duct 127 and two larger ducts 129, 130 disposed as shown in Fig. 13.

Jack 140 which controls the tail-skid 5 comprises a piston 141 the rod 142 of which is connected to lever 139 and another piston 143, an air-filled chamber 144 being located between these pistons. The chamber 145 which is closed by piston 141 is connected through a pipe 146 to pipe 52a while the chamber 147 which is closed by piston 143 is connected to pipe 118a through pipe 148.

The arrangement described hereinabove operates as follows:

To lower the skids the pilot moves the lever 63 to the position illustrated in Fig. 13. The chamber 71 of distributor 58 controlling the central skids is thus connected to the pump P and the chamber 72 to the reservoir B through the set of valves 67 and 65, respectively. The jack 59 is thus actuated.

If, from this moment on, the pilot wants to lower the wheel, he may move the lever 45 to the presetting position selected beforehand, since the portion of chamber 50 which is located behind the piston 49 is connected to the reservoir B. During this movement, a fluid communication is established between the ports 53 and 60. The valve 61 remains seated, and the valve 62 connected to the chamber 71 connected in turn to the pump P is unseated, so that the fluid delivered from the pump P will move the piston of the retracting jack 40 to the position illustrated in the figure as the wheel is lowered.

To retract the wheel, the pilot may move the lever 45 in the opposite direction or, if the central skids are also to be retracted, he may simply act on the lever 63 controlling the distributor 58 associated with the skids so as to move the lever from the position illustrated in Fig. 13 to the position indicated at 63a. Thus, the chamber 71 is connected with the reservoir B through the valve 68 and the chamber 72 with the pump P through the valve 66. The pressure built up in the chamber 72 is transmitted through the pipe 57 to the chamber 50 behind the piston 49, thereby moving the rod 46 and the pistons 47, 48, 49 associated therewith until the piston 47 engages the wall of the wheel distributor 51. In this position the jack 59 is retracted. On the other hand, the valve 62 connected to the chamber 71 is closed since it is in its exhaust position, whilst the valve 61 connected to the chamber 72 is unseated or opened. The ports 52 and 60 communicate with each other and the fluid pressure is transmitted to the opposite face of the retracting jack 40, thereby raising the wheel. The exhaust of fluid from this jack takes place through the port 53 communicating with the fluid reservoir B between the pistons 48 and 49, through the port 56 and the chamber 54 of the wheel distributor 51.

When the central skids are retracted, the control lever 63 is in position 63a. As already indicated, the chamber 71 is connected with reservoir B, and the chamber 72 with pump P, through the valves 68 and 66, respectively. If, at this time, the pilot wants to lower the wheel 21 (now retracted) by actuating the presetting lever 45 from its original position 45a, this actuation is prevented by the fact that the fluid pressure existing in the duct 57 and, therefore, in the chamber 50 behind the piston 49 locks the lever 45 against movement.

The arrangement thus described with reference to the embodiment illustrated in Figs. 9 to 13 meets the three requirements set forth hereinabove, i.e.:

(a) to prevent the wheel from being lowered when the skids are retracted;

(b) to permit the lowering of the wheel when the aircraft bears on the ground through at least one of its central skids, and (c) to cause the retraction of both the wheel and central skids upon actuation of the skid control alone.

As the pilot controls the lowering of the wheel to be lowered by moving the presetting lever 45 to a presetting position such as illustrated in Fig. 13, this lever acts through the rod 73 on the cam lever 74 of the double pressure-reducing adjustable device 75. Thus, the cam lever 74 causes the piston 77 through the spring 79 to move the differential piston 81—81a which in turn moves the valve 86 against the resistance of its spring under the action of the small piston 81a on stem 86a. The chamber 88 connected to cylinder 89 is connected with the chamber 84 and an air pressure equal to that existing in said cylinder 82 tends to be established in the chamber 109 of the adjustable overpressure valve device through the pipe-line 84a. As soon as said air pressure attains a predetermined value which depends from the compression of spring 79 under the action of cam lever 74 and therefore from the positions of said cam lever 74 and of lever 45, the small piston 81a rises while the valve 85 closes. Air escapes through the canal 82 of the differential piston 81—81a until the air pressure through the pipe-line 84a balances the action of spring 79 on said differential piston. The small piston 81a then contacts the stem 86a of valve 86 without displacing said valve. The pressure thus obtained in the chamber 109, which is subordinate to the position of the cam lever 74 and, therefore, to the presetting lever position, closes the valve 117 through the action of both pistons 112, 116 and opens the valve 114 against the resistance of its spring 115 through the action of both pistons 111 and 113. The upper chamber of the suspension and load-adjustment jack 44 is connected with the pump P. As soon as the pressure in said upper chamber attains a predetermined value piston 113 closes valve 114, piston 116 remaining stationary since the area of piston 110 is greater than that of piston 111. The pressure in the chamber 109 is restored, as above indicated, at its predetermined value (this pressure being in turn subordinate to the position of the control lever 45), the jack is fed at a constant pressure which is a function of this position of the lever 45.

During said operation, chamber 147 of jack 140 is connected to the pump P through pipe 148 whilst its chamber 145 is connected to the reservoir B through pipes 146 and 52a. The tail-skid 5 is lowered.

At the same time, the cam lever 74 acts through the piston 76 and spring 78 to move the piston 80 to the position in which the valve 85 coupled thereto is unseated. Thus, the chamber 87 is connected with the chamber 83, and the wheel tyre 22 is connected through the pipe line 90, 91, 92 and 93 with said chamber 87.

As already indicated for the pressure existing in the chamber 109, the air pressure in said pipe-line and tyre 22 is related to the compression of spring 78 under the action of cam lever 74, i.e. to the position of lever 45.

Thus, for the various positions of said lever 45, predetermined pressures are established within chamber 109, jacks 44 and 140 and tyre 22, said pressures depending from the compression of springs 79 and 78 under the action of the cam lever 74. Said pressures are selected in order to apply to the wheel 21 and the skid 5 preadjusted constant loads corresponding to various natures of the ground, on the one hand, and, on the other hand, to obtain inflation pressures corresponding to said natures of the ground as estimated and preset by the pilot by means of the lever 45.

If the shape and/or the nature of the landing ground causes the wheel to be momentarily loaded beyond the value corresponding to the position of the presetting lever 45, the piston 119 of the suspension and load-adjustment jack 44 moves upwards, the air cushion 121 acting as a shock absorber. According to the value and rapidity of the momentary displacement of piston 119, its companion piston 120 will force some fluid out from the jack 44 and this fluid will move the piston 116 to open the valve 117, thus connecting the upper chamber of the jack 44 with the fluid reservoir B. At the same time, the volume of the chamber formed between the piston 119 and the lower end of the jack cylinder 44 increases and is fed from the re-feeding accumulator 123 through the ducts 129, 130 of greater cross-sectional area of the movable member 126 of the valve device 122.

If the load supported by the wheel becomes inferior to the predetermined load corresponding to the position of the presetting lever 45, the piston 119 of the suspension and load-adjustment jack 44 will move downwards, the pressure-reducing device 75 feeding this jack with fluid at the constant, corresponding pressure, as already explained hereinabove in connection with the feeding of said jack 44 during the presetting operation.

If a lower pressure is preset, for example in view of passing from a hard runway to a soft ground, the presetting lever 45 will move in the direction of position 45a to the desired intermediate position. The cam lever 74 unloads the spring 79, thereby allowing the piston 81 to move upwards and causing the valve 86 coupled thereto to be seated; as a consequence, the air contained in the chambers 84 and 109 is exhausted through the fluid passage 82 of this piston 81. The pressure developed in the jack 44 opens the valve 117 by acting upon the piston 116, as the latter is no more balanced by the pressure exerted on the piston 112, until the pressure in the chambers 84 and 109 attains the value corresponding to the position in which the cam lever 74 is located. The piston 81 now closes on the valve 86 without moving the latter. Then, the component elements or the adjustable pressure-reducing device 75 and of the adjustable overpressure valve device 110 resume the positions which they occupied prior to the change brought in the presetting.

The retraction of the tail-skid 5 is effected by moving the presetting lever 45 to its original position 45a, the result of which is to interconnect, on the one hand, chamber 147 and reservoir B and, on the other hand, chamber 145 and pump P.

The inflation pressure of the tyre 22 as a function of the nature of the ground is also adjusted through the movement of the differential piston 80 and its leakage duct 82 as explained hereinabove in connection with the differential piston 81 and its leakage duct.

The steering jack 37 is connected to any known feed device adapted to control the steering of the wheel by acting upon the yoke-carrying lever 29 rigid with the toothed segment 28, the toothed segment 27 being held against movement, in this case, by the retraction jack 49.

Of course, many modifications may be brought to the device described hereinabove and illustrated in the attached drawings, without departing from the scope of the invention, as set forth in the appended claims. More particularly, the aircraft may be equipped with a front landing-gear fully retractable under flying conditions.

Similarly, the tail skid or skids of the aircraft may also be of the retractable type and their control obtained, in this case, with the assistance of one or more jacks mounted in parallel with the jack 59. Again, this or these tail-skids may comprise either an adjustable-load suspension system similar to the one described hereinabove in connection with the front landing-gear (in which case the latter will remain under a fixed load), or means for adjusting the position of the tail-skid or skids which are combined with the adjustable-load suspension system associated with the front landing-gear.

What we claim is:

1. Device for the take-off and landing of aircraft with fuselage comprising, in combination, a rear ground-engaging retractable assembly carried by the fuselage at the tail-end thereof and adapted to engage the ground at take-off, at landing and at taxying of the aircraft, means interposed between the fuselage and said assembly for retracting the latter, a pair of retractable central skids secured on the fuselage in front of the center of gravity of the aircraft, means connected to said skids and carried by the fuselage for retracting and lowering said skids, a steerable and at least partially retractable front landing-gear carried by the fuselage in front of said central skids and having at least one wheel, means connected to said front landing-gear and carried by the fuselage for retracting at least partially and lowering said front landing-gear, means connected to said front landing-gear and carried by the fuselage for steering said front landing gear, and means carried by the fuselage and connected to the retracting and lowering means for said front landing-gear for adjusting the height of said front landing-gear according to the firmness of the ground on which moves the aircraft.

2. Device according to claim 1, wherein the means for adjusting the height of the front landing-gear comprises a feeler rod secured on the support of the landing-gear axle and having a length so determined that it is disengaged from the ground when said front landing-gear bears on a hard ground while it engages the ground when said front landing-gear bears on a soft ground, a tell-tale lamp disposed in the pilot's cockpit and an electrical circuit feeding said lamp and having a normally open contact adapted to be closed by the deformation of said rod feeler when the latter engages the ground in order to indicate to the pilot he must raise the front landing-gear for loading the central skids.

3. Device for the take-off and landing of aircraft with fuselage comprising, in combination, a rear ground-engaging retractable assembly carried by the fuselage at the tail-end thereof and adapted to engage the ground at take-off, at landing and at taxying of the aircraft, means interposed between the fuselage and said assembly for retracting the latter, a pair of retractable central lateral skids secured on the fuselage in front of the center of gravity of the aircraft, means connected to said skids and carried by the fuselage for retracting and lowering said lateral skids, a steerable and at least partially retractable front landing-gear carried by the fuselage in front of said central lateral skids and having at least one wheel equipped with a tyre and an articulated suspension assembly interposed between said landing-gear and the fuselage, a retracting and lowering jack connected to said suspension assembly and pivotally mounted on the fuselage, means secured on the fuselage and connected to said suspension assembly for applying to said suspension assembly a substantially constant load preselected by the pilot as a function of a few typical cases of predetermined ground characteristics, said last means allowing to automatically vary simultaneously the vertical position of said front landing-gear with respect to the fuselage as a function of the actual nature and shape of the ground, and means carried by the fuselage and connected to said front landing-gear for steering said front landing-gear.

4. Device according to claim 3, further comprising a source of hydraulic fluid under pressure and wherein the means for retracting the rear ground-engaging assembly and the central lateral skids comprise hydraulic jacks, the retracting jack of the suspension assembly of the front landing-gear being hydraulic, all said jacks being connected to said source.

5. Device according to claim 4, wherein the means for applying a substantially constant load to the suspension assembly and for simultaneously varying the vertical position of the front landing-gear comprise a suspension and load hydraulic jack connected to said assembly and pivotally mounted on the structure of the aircraft, an adjustable overpressure valve inserted in the feeding line of the suspension and load jack and connected to the source of hydraulic fluid under pressure to permit the automatic variation in the vertical position of the front landing-gear in accordance with the actual nature and shape of the ground on which the aircraft moves, a pressure-reducing adjustable device controlled by the pilot and connected to said adjustable overpressure valve for adjusting the hydraulic pressure applied to said jack as a function of the typical cases of predetermined ground characteristics, and a source of air under pressure connected to said pressure-reducing device.

6. Device, according to claim 5, wherein the suspension and load jack comprises a power piston connected to the suspension assembly, a complementary piston opposed to said power piston and an air cushion inserted between said two pistons.

7. Device, according to claim 5, wherein the pressure-reducing adjustable device is of the pneumatic type whilst the adjustable overpressure valve is of the hydropneumatic type.

8. Device, according to claim 3, further comprising a source of air under pressure and means connected to said source and to the tyre of each wheel for applying a constant inflation pressure to said tyre as a function of the typical ground characteristic selected by the pilot in order to apply to the front landing-gear a substantially constant load.

9. Device, according to claim 5, further comprising means for applying a constant inflation pressure to the tyre fitted on each wheel consisting of a pipe connected to the adjustable pressure-reducing device, a hollow casing carried by the axle of the wheel and defining with said axle a chamber connected to the tyre, and a pivoting joint pivotally mounted on said casing and adapted to interconnect said pipe and said chamber.

10. Device, according to claim 3, wherein the suspension assembly steering means and the retracting and lowering means for the front landing-gear comprise two jacks pivotally mounted on the structure of the aircraft, one for the steering operations and the other for the retracting and lowering operations, transmission means connecting said jacks to the front landing-gear, and a box-sectioned member supporting said front landing-gear and pivotally mounted on said structure, said two jacks and said box-sectioned member forming a double parallel-link system which allows the vertical movement of the front-landing gear without interfering with the load applied by the substantially constant load-applying means.

11. Device, according to claim 10, wherein the transmission means connecting the jacks to the front landing-gear comprises an arm having a yoke-shaped end on which is pivotally mounted the end of the rod of the retracting jack, a torsion shaft integral with said arm and mounted for rotation on the box-sectioned member, said torsion shaft being provided with a central cylindrical recess perpendicular to its axis, a pivot pin rigid with the front landing-gear and journalled in said recess, a toothed segment rigid with said pivot pin, a second toothed segment loosely mounted on said torsion shaft and integral with a lever having a yoke-shaped end on which pivots the end of the rod of the steering jack for holding said second segment against movement by the steering jack during the retraction of the front landing-gear, whereby each wheel of said landing-gear rotates through 90° to attain a substantially flat retracted position.

12. Device, according to claim 3, further comprising means interconnecting the retracting and lowering means of the central lateral skids and of the front landing-gear and adapted, on the one hand, to prevent the lowering of said landing-gear under the action of its own retracting and lowering means as long as the central lateral skids are retracted, on the other hand, to permit the actuation of the retracting and lowering means of said front landing-gear in order to lower said landing-gear as soon as said central lateral skids are lowered, and, finally, to ensure the simultaneous retraction of said front landing-gear and central lateral skids.

13. Device for the take-off and landing of aircraft with fuselage comprising, in combination, a steerable and at least partially retractable front landing-gear carried by the fuselage at its front end and having at least one wheel, means secured on the fuselage and having a jack connected to said front landing-gear for retracting at least partially and lowering said front landing-gear, means secured on the fuselage and connected to said landing-gear for steering said landing-gear, a pair of retractable central lateral skids secured on the fuselage in front of the center of gravity of the aircraft, means carried by the fuselage and connected to said skids for retracting and lowering said central lateral skids, a retractable rear landing-gear carried by the fuselage at the tail-end thereof and having at least one skid, a retracting and lowering jack connected to said rear landing-gear and pivotally mounted on the aircraft structure, means connected to said front landing-gear and to the retracting jack of said rear landing-gear for applying to said front and rear landing-gears a substantially constant load preselected by the pilot according to a few typical cases of predetermined ground characteristics, and for automatically varying simultaneously the vertical position of said front and rear landing-gears with respect to the fuselage as a function of the actual nature and shape of the ground on which moves the aircraft.

14. Device according to claim 13, wherein the retracting and lowering jack controlling the rear landing-gear is hydraulic, and wherein the means for applying a substantial constant load to the front and rear landing-gears and for simultaneously varying the vertical position of said landing-gears comprise a hydraulic suspension and load jack connected to the front landing-gear and pivotally mounted on the structure of the aircraft, an adjustable overpressure valve hydraulically connected to said suspension and load jack and to the retracting and lowering jack controlling the rear landing-gear to permit the automatic variation in the vertical position of the front and rear landing-gear in accordance with the actual nature and shape of the ground on which the aircraft moves, a source of hydraulic fluid under pressure connected to said valve, a pressure-reducing adjustable device controlled by the pilot and connected to said adjustable overpressure valve for adjusting the hydraulic pressure applied to said jack as a function of the typical cases of predetermined ground characteristics, and a source of air under pressure connected to said pressure-reducing device.

15. Device, according to claim 14, wherein the jack for retracting and lowering the rear landing-gear comprises a power piston connected to the rear landing-gear, a complementary piston opposed to said power piston and an air cushion inserted between said two pistons.

16. Device, according to claim 14, wherein the pressure-reducing adjustable device is of the pneumatic type whilst the adjustable overpressure valve is of the hydropneumatic type.

17. Device, according to claim 13, wherein a hydraulic system is connected to said jacks, said hydraulic system including a hydraulic circuit for the retracting and lowering jack controlling the rear landing-gear and connected in parallel with that of the retracting and lowering jack controlling the front landing-gear.

18. Device for the take-off and landing of aircraft having a fuselage comprising, in combination, three at least partially retractable landing means respectively carried by the fuselage through three transverse planes disposed at right angles to the longitudinal plane of symmetry of the aircraft, two of said transverse planes being positioned in front of the center of gravity of said aircraft, means carried by the fuselage and connected to said three landing means for lowering and retracting said three landing means, means selected by the pilot for controlling at take-off, at landing and at taxying the lowering of the landing means positioned behind the center of gravity and the lowering at least partial retracting of at least one of said landing means positioned in front of said center of gravity according to the nature and firmness of the ground on which moves the aircraft in order to adjust the load applied to the thus lowered landing means in relation to said nature and firmness of he ground.

References Cited in the file of this patent

UNITED STATES PATENTS

| | | |
|---|---|---|
| 2,483,027 | Van Zelm et al. | Sept. 27, 1949 |
| 2,646,235 | Dawson | July 21, 1953 |
| 2,741,446 | Jakimuik | Apr. 10, 1956 |